US007287375B2

(12) United States Patent
Goto et al.

(10) Patent No.: US 7,287,375 B2
(45) Date of Patent: Oct. 30, 2007

(54) HYDRAULIC CONTROL DEVICE AND INDUSTRIAL VEHICLE WITH HYDRAULIC CONTROL DEVICE

(75) Inventors: Tetsuya Goto, Kariya (JP); Takeharu Matsuzaki, Kariya (JP); Shigeto Nakajima, Nagano-ken (JP); Yasuhiro Maeda, Nagano-ken (JP); Keinosuke Ichikawa, Nagano-ken (JP)

(73) Assignees: Kabushiki Kaisha Toyota Jidoshokki, Kariya-shi (JP); Nishina Industrial Co. Ltd., Kamiminochi-gun, Nagano-ken (JP)

( * ) Notice: Subject to any disclaimer, the term of this patent is extended or adjusted under 35 U.S.C. 154(b) by 475 days.

(21) Appl. No.: 10/465,772

(22) Filed: Jun. 19, 2003

(65) Prior Publication Data

US 2004/0020196 A1 Feb. 5, 2004

(30) Foreign Application Priority Data

Jun. 19, 2002 (JP) ............................ 2002-178780

(51) Int. Cl.
*F16D 31/02* (2006.01)

(52) U.S. Cl. ........................................................ 60/468

(58) Field of Classification Search .................. 60/468
See application file for complete search history.

(56) References Cited

U.S. PATENT DOCUMENTS 4,468,173 A * 8/1984 Dantlgraber ................. 60/468
4,845,947 A * 7/1989 Persson et al. ............... 60/468
5,537,819 A * 7/1996 Kobayashi ................... 60/468

FOREIGN PATENT DOCUMENTS

JP 11-315803 11/1999

* cited by examiner

*Primary Examiner*—F. Daniel Lopez
(74) *Attorney, Agent, or Firm*—Morgan & Finnegan, L.L.P.

(57) ABSTRACT

A main spool is located in a bypass line connecting a pump line to a return line. The main spool moves in an axial direction according to the pressure in a spring chamber and the pressure in a pilot chamber, thereby adjusting the opening degree of the bypass line. A pilot switching valve is located in a pressure control passage connecting the spring chamber to the return line. The pilot switching valve controls the flow rate of hydraulic oil that flows from the spring chamber to the return line in accordance with the load pressure of a hydraulic actuator, thereby adjusting the pressure of hydraulic oil in the spring chamber. As a result, the range of the flow rate of hydraulic oil supplied to the hydraulic actuator, which range precludes the influence of the load pressure of the hydraulic actuator, is expanded.

12 Claims, 10 Drawing Sheets

HYDRAULIC CONTROL DEVICE AND INDUSTRIAL VEHICLE WITH HYDRAULIC CONTROL DEVICE

BACKGROUND OF THE INVENTION

The present invention relates to a hydraulic control device applied to a hydraulic loading apparatus of an industrial vehicle such as a forklift. More particularly, the present invention relates to a hydraulic control device that maintains the flow rate of hydraulic fluid flowing from a high pressure circuit to a low pressure circuit of a hydraulic apparatus regardless of load fluctuations of the low pressure circuit.

Japanese Laid-Open Patent Publication No. 11-315803 disclose such a hydraulic control device. The hydraulic control device of the publication is applied to a forklift that has a hydraulic actuator. The hydraulic actuator is operated with a switching valve. The hydraulic control device is capable of sending hydraulic oil the flow rate of which corresponds to the opening degree of the switching valve to the hydraulic actuator. That is, the hydraulic actuator is connected to a high pressure circuit through the switching valve. A pump sends hydraulic oil from a tank to the high pressure circuit. When the switching valve is manipulated, hydraulic oil is supplied to the hydraulic actuator from the high pressure circuit through the switching valve, which actuates the hydraulic actuator. The switching valve and the hydraulic actuator form a downstream circuit.

The hydraulic control device of the publication has a bypass type flow control valve. The flow control valve includes a spool, a pilot chamber corresponding to one end of the spool, and a spring chamber corresponding to the other end of the spool. A spring for urging the spool toward the pilot chamber is provide in the spring chamber. A return circuit is provided to return hydraulic oil to the tank. The high pressure circuit is connected to the return passage with an oil passage. The spool is moved to adjust the opening degree of the oil passage connecting the high pressure circuit with the return circuit.

When the hydraulic actuator is being actuated, the pressure of hydraulic oil in a section upstream of the switching valve acts on the pilot chamber and presses the spool toward the spring chamber. Hydraulic oil in a section downstream of the switching valve, or hydraulic oil receiving the load pressure of the hydraulic actuator, enters the spring chamber and urges the spool toward the pilot chamber. The spool is moved to an axial position at which a force based on the pressure of hydraulic oil in the pilot chamber is in equilibrium with a force based on the pressure of hydraulic oil in the spring chamber and the force of the spring. The spool thus adjusts the opening degree of the oil passage between the high pressure circuit and the tank circuit. In other words, the flow control valve adjusts the flow rate of hydraulic oil flowing from the high pressure circuit to the return circuit in accordance with the load pressure of the hydraulic actuator, thereby compensating for the flow rate of hydraulic oil supplied from the high pressure circuit to the downstream circuit. That is, the flow control valve prevents the flow rate of hydraulic oil supplied from the high pressure circuit to the downstream circuit from being influenced by the load pressure in the downstream circuit. As a result, regardless of the load pressure of the hydraulic actuator, hydraulic oil is supplied to the hydraulic actuator at a flow rate corresponding to the opening degree of the switching valve.

In the hydraulic control device of the above publication, a flow rate compensation mechanism for the downstream circuit is formed only by the spool of the flow control valve.

Therefore, the range of the flow rate of hydraulic oil supplied to the downstream circuit, in which range the influence of the load pressure of the downstream circuit is precluded, is narrow. That is, when the flow rate of hydraulic oil supplied to the downstream circuit is in a compensation range, the influence of the load pressure is precluded. However, if the flow rate is out of the compensation range, the flow rate of hydraulic oil is influenced by the load pressure. In the hydraulic control device of the above publication, the flow rate of hydraulic oil is compensated for in a small range to eliminate the influence of the load pressure.

SUMMARY OF THE INVENTION

Accordingly, it is an objective of the present invention to provide a hydraulic control device that is suitable for expanding the range of the flow rate of hydraulic fluid, which range precludes the influence of the load pressure of a downstream circuit.

To achieve the foregoing and other objectives and in accordance with the purpose of the present invention, a hydraulic control device for controlling supply of hydraulic fluid from a high pressure circuit to a downstream circuit is provided. The downstream circuit includes a hydraulic actuator and a switching valve for operating the hydraulic actuator. The high pressure circuit is connected to a hydraulic fluid return circuit through a bypass line. The hydraulic control device includes a flow rate compensation mechanism, which adjusts the opening degree of the bypass line according to the load pressure of the downstream circuit, thereby adjusting the flow rate of hydraulic fluid flowing from the high pressure circuit to the return circuit such that the flow rate of hydraulic fluid supplied from the high pressure circuit to the downstream circuit is compensated for. The flow rate compensation mechanism includes an actuation valve member, a first pressure chamber, a second pressure chamber, and a pressure controller. The actuation valve member is movable in an axial direction to adjust the opening degree of the bypass line. The actuation valve member includes a first end and a second end opposite from the first end. The first pressure chamber corresponds to the first end of the actuation valve member. Hydraulic fluid from the high pressure circuit is drawn into the first pressure chamber. The second pressure chamber corresponds to the second end of the actuation valve member. Hydraulic fluid from the high pressure circuit is drawn into the second pressure chamber. The pressure of hydraulic fluid in the first pressure chamber presses the actuation valve member toward the second pressure chamber. The pressure of hydraulic fluid in the second pressure chamber presses the actuation valve member toward the first pressure chamber. The actuation valve member is moved in the axial direction according to the pressure of hydraulic fluid in the first pressure chamber and the pressure of hydraulic fluid in the second pressure chamber. The pressure controller controls the pressure of hydraulic fluid in the first pressure chamber according to the load pressure of the downstream circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A hydraulic control device according to a first embodiment of the present invention will now be described with reference to FIGS. 1 to 4. The hydraulic control device of this embodiment is applied to a loading unit of a forklift.

Figure 1:
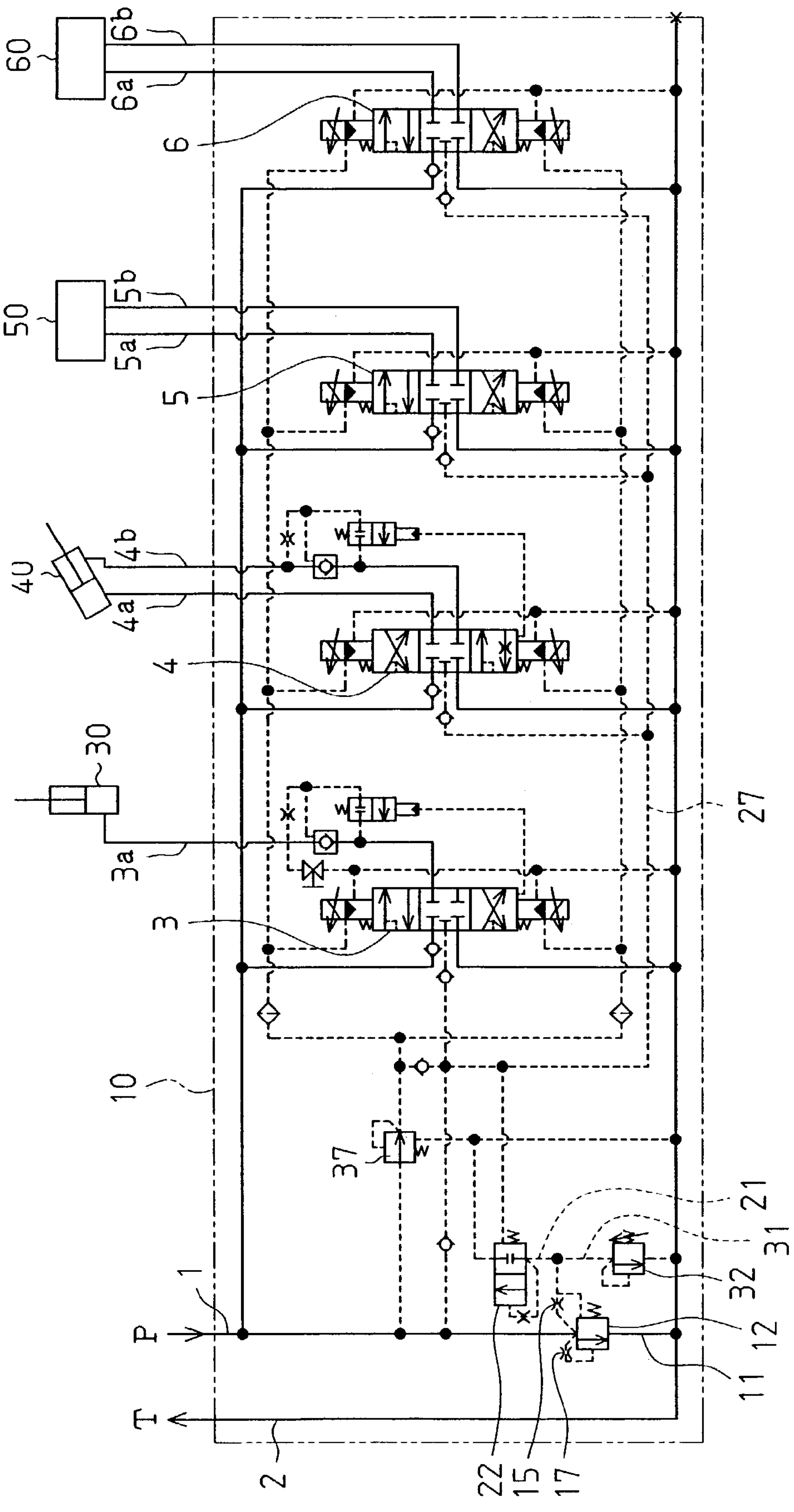
FIG. 1 is a circuit diagram showing a hydraulic control device according to a first embodiment of the present invention.

A hydraulic pump P, which is driven by a battery (not shown), draws hydraulic oil from a tank T and discharges the hydraulic oil, thereby supplying oil to a hydraulic control circuit shown in FIG. 1. As shown in FIG. 1, the hydraulic oil is sent to a lift cylinder switching valve 3, a tilt cylinder switching valve 4, and first and second attachment cylinder switching valves 5, 6 through a pump line 1, which forms a high pressure circuit. The forklift has loading actuators including a lift cylinder 30, a tilt cylinder 40 and first and second attachment cylinders 50, 60. The loading actuators 30 to 60 are each operated by the corresponding one of the switching valves 3 to 6. The forklift also has manipulation members (not shown) such as levers for operating the switching valves 3 to 6. The hydraulic oil is returned to the tank T through a return line 2, which forms a return circuit.

The switching valves 3 to 6 are connected in parallel with the pump line 1 and the return line 2. The lift cylinder switching valve 3 is connected to the lift cylinder 30 through a hydraulic line 3*a*. The tilt cylinder switching valve 4 is connected to the tilt cylinder 40 through a pair of hydraulic lines 4*a*, 4*b*. The first attachment cylinder switching valve 5 is connected to the first attachment cylinder 50 through a pair of hydraulic lines 5*a*, 5*b*. The second attachment cylinder switching valve 6 is connected to the second attachment cylinder 60 through a pair of hydraulic lines 6*a*, 6*b*.

Each of the switching valves 3 to 6 is switched among a neutral position, a first actuation position, and a second actuation position. In the neutral positions, which are shown in FIG. 1, the switching valves 3 to 6 shut passages provided inside to disconnect the hydraulic lines 3*a*, 4*a*, 4*b*, 5*a*, 5*b*, 6*a*, and 6*b* from the pump line 1 and the return line 2. When at the first actuation position, the lift cylinder switching valve 3 connects the hydraulic line 3*a* to the pump line 1. When at the second actuation position, the lift cylinder switching valve 3 connects the hydraulic line 3*a* with the return line 2. When at the first actuation position, the tilt cylinder switching valve 4 connects the hydraulic line 4*a* with the return line 2 and connects the hydraulic line 4*b* with the pump line 1. When at the second actuation position, the tilt cylinder switching valve 4 connects the hydraulic line 4*a* with the pump line 1, and connects the hydraulic line 4*b* with the return line 2. When at the first actuation positions, the attachment cylinder switching valves 5, 6 connect the hydraulic lines 5*a*, 6*a* with the pump line 1, and connect the hydraulic lines 5*b*, 6*b* with the return line 2. When at the second actuation positions, the attachment cylinder switching valves 5, 6 connect the hydraulic lines 5*a*, 6*a* with the return line 2, and connect the hydraulic lines 5*b*, 6*b* with the pump line 1.

When at an actuation position, each of the switching valves 3 to 6 is configured to adjust its opening degree to a degree that corresponds to the amount of manipulation of the corresponding lever. The lift cylinder 30 is a single-acting type, which is lowered by the self weight. The switching valves 3 to 6, the cylinders 30 to 60 corresponding to the switching valves 3 to 6, and the hydraulic lines 3*a*, 4*a*, 4*b*, 5*a*, 5*b*, 6*a*, 6*b* form a downstream circuit.

A flow rate compensation valve mechanism and a relief valve mechanism are located upstream of the switching valves 3 to 6. The flow rate compensation valve mechanism functions to maintain the flow rate of hydraulic oil flowing to the downstream circuit to a certain level regardless of load fluctuations in the downstream circuit. In other words, the flow rate compensation valve mechanism compensates for the flow rate of hydraulic oil supplied to the downstream circuit in relation to the load fluctuations in the downstream circuit. The relief valve mechanism functions to limit the pressure of hydraulic oil in the downstream circuit to a level equal to or lower than a predetermined permissible value. The switching valves 3 to 6, the flow rate compensation valve mechanism, and the relief valve mechanism are accommodated in a single valve body 10. In FIG. 1, the valve body 10 is shown by two dot chain line. The switching valves 3 to 6 may be accommodated in separate valve bodies.

Figure 2:
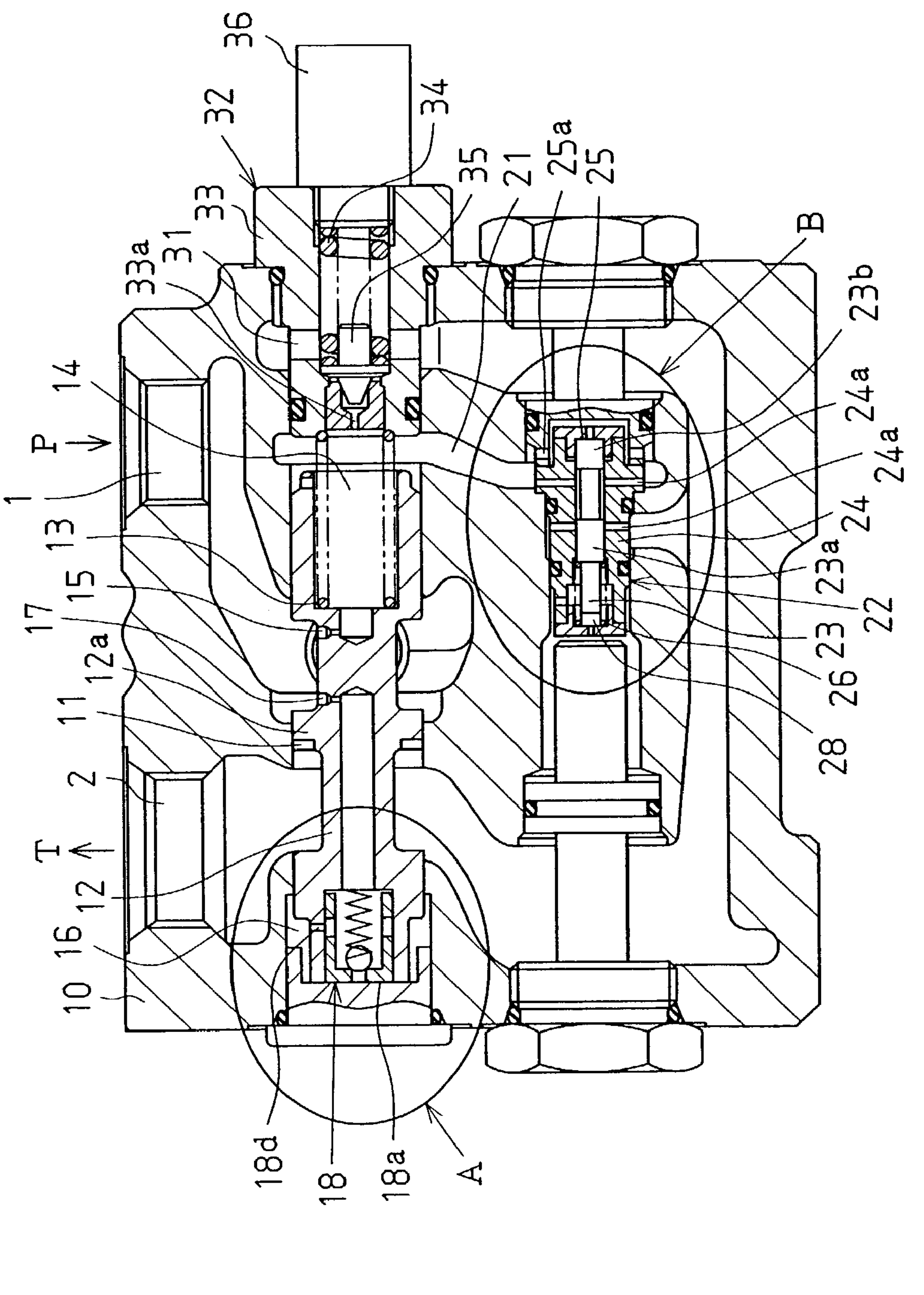
FIG. 2 is a cross-sectional view illustrating a main part of the hydraulic control device shown in FIG. 1.

As shown in FIG. 2, a bypass line 11 is formed in the valve body 10 to directly connect the pump line 1 with the return line 2. A main spool 12 is located in the bypass line 11 to open and close the bypass line 11. A spring chamber 14 is defined at one end of the main spool 12 in the axial direction. A pilot chamber 16 is defined in a part of the valve body 10 that corresponds to the other axial end of the main spool 12. A spring 13 is accommodated in the spring chamber 14. The spring chamber 14 is connected to the pump line 1 through a first constriction 15. The pilot chamber 16 is connected to the pump line 1 through a second constriction 17 and an axial passage formed in the main spool 12.

The main spool 12 has a land 12*a* at an axially central portion. When the hydraulic pump P is not operating, the main spool 12 is positioned at an axial position shown in FIG. 2 by the force of the spring 13. As a result, the land 12*a* closes the bypass line 11. When the hydraulic pump P is operating, the main spool 12 is moved to an axial position at which a force (a leftward force as viewed in FIG. 2) based on the pressure of hydraulic oil acting on the spring chamber 14 and the force of the spring 13 is in equilibrium with a force (a rightward force as viewed in FIG. 2) based on the pressure of hydraulic oil acting on the pilot chamber 16. The opening degree of the bypass line 11 is adjusted in accordance with the axial position of the main spool 12. The main spool 12 functions as an actuation valve member. The spring chamber 14 functions as a first pressure chamber, which corresponds to one end of the actuation valve member. The pilot chamber 16 functions as a second pressure chamber, which corresponds to the other end of the actuation valve member.

Figure 3:
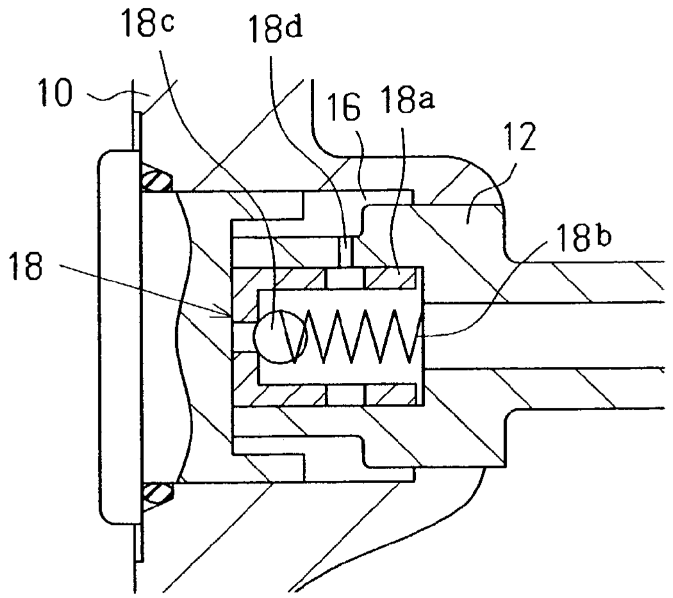
FIG. 3 is an enlarged view showing encircled part A of FIG. 2.

A restriction 18 is located in a hydraulic passage between the pilot chamber 16 and the second constriction 17. As shown in FIG. 3, the restriction 18 includes a cylindrical body 18*a* fitted in an end of the main spool 12 and a ball 18*c* urged by a spring 18*b*. Hydraulic oil flows from the interior of the cylindrical body 18*a* and enters the pilot chamber 16 through an orifice 18*d*. A passage is formed in the end wall of the cylindrical body 18*a*. The passage has a relatively large cross-sectional area. The spring 18*b* urges the ball 18*c* such that the ball 18*c* closes the passage. Hydraulic oil in the pilot chamber 16 pushes open the ball 18*c* through the passage and flows out of the pilot 16. The orifice 18*d* increases the flow resistance applied to hydraulic oil flowing to the pilot chamber 16. On the other hand, hydraulic oil in the pilot chamber 16 opens the ball 18*c* with a relatively small force. Thus, the main spool 12 is prevented from moving rapidly toward the spring chamber 14, and vibrations due to rapid movements of the main spool 12 are prevented.

Figure 4:
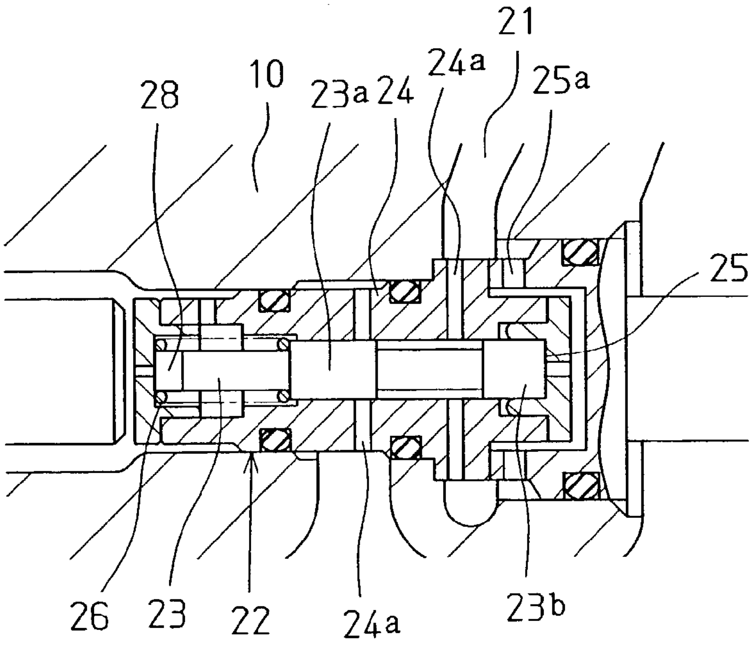
FIG. 4 is an enlarged view showing encircled part B of FIG. 2.

As shown in FIG. 2, the spring chamber 14 is connected to the return line 2 through a pressure control passage 21. A pilot switching valve 22 is located in the pressure control passage 21. As shown in FIG. 4, the pilot switching valve 22 includes a main body 24 and a spool 23. The spool 23 is accommodated in the main body 24 such that the spool 23 moves in the axial direction. An oil passage 24*a* is formed in the main body 24. The oil passage 24*a* connects an upstream section and a downstream section of the pressure control passage 21 to each other. The oil passage 24*a* forms a part of the pressure control passage 21. The spool 23 has a land 23*a* at an axially central portion and a land 23*b* at an axially end portion. The land 23*a* functions to adjust the opening degree of the oil passage 24*a*. The flow rate of hydraulic oil flowing from the spring chamber 14 to the return line 2, that is, the pressure in the spring chamber 14 is adjusted in accordance with the opening degree of the oil passage 24*a*. As the spool 23 moves further leftward as viewed in FIG. 4, the opening degree of the oil passage 24*a* is increased.

The main body 24 has a pilot chamber 25 and a spring chamber 28. The pilot chamber 25 corresponds to an axial end of the spool 23. The spring chamber 28 corresponds to the other axial end of the spool 23. The pilot chamber 25 is connected to an upstream section of the pressure control passage 21 through an oil passage 25*a* formed in the main body 24. The spring chamber 28 accommodates a spring 26 and is connected to a feedback line 27 (see FIG. 1). The feedback line 27 is exposed to the load pressure of the cylinders 30 to 60, which collectively function as the loading actuator.

When the hydraulic pump P is not operating, the spool 23 is positioned at an axial position shown in FIG. 4 by the force of the spring 26. As a result, the land 23*a* closes the oil passage 24*a*. When the hydraulic pump P is operating and the load pressure of the cylinders 30 to 60 is not acting on the spring chamber 28, the spring chamber 28 is exposed to a pressure that has passed through a decompression valve 37 shown in FIG. 1. Then, the spool 23 is moved to an axial position at which a force (a leftward force as viewed in FIG. 4) based on a set pressure of the decompression valve 37 acting on the spring chamber 28 and the force of the spring 26 is in equilibrium with a force (a rightward force as viewed in FIG. 4) based on the pressure of hydraulic oil acting on the pilot chamber 25. Accordingly, the oil passage 24*a* is opened. When the hydraulic pump P is operating and the load pressure of at least one of the cylinders 30 to 60 is acting on the spring chamber 28, the spool 23 is moved to an axial position at which a force based on the load pressure acting on the spring chamber 28 and the force of the spring 26 is equilibrium with the force of hydraulic oil acting on the pilot chamber 25. Accordingly, the oil passage 24*a* is opened. The opening degree of the oil passage 24*a,* in other words, the pressure in the spring chamber 14 (see FIG. 2), is controlled to be a value that corresponds to the load pressure of the cylinders 30 to 60, which is fed back to the spring chamber 28.

The pilot switching valve 22 functions as a pressure controlling portion. The main spool 12 and the pilot switching valve 22 form the flow rate compensation valve mechanism.

As shown in FIG. 2, the spring chamber 14 of the main spool 12 is connected to the return line 2 at an upstream section of the pilot switching valve 22 through a relief passage 31. A relief valve pilot cartridge 32 is located in the relief passage 31. The pilot cartridge 32 includes a cartridge body 33, a poppet 35 accommodated in the cartridge body 33, a spring 34 urging the poppet 35 in a direction closing a relief hole 33*a*. The relief hole 33*a* form a part of the relief passage 31. The poppet 35 is constantly pressed against a sealing surface of the cartridge body 33 by the spring 34 and closes the relief hole 33*a*.

The poppet 35 receives a pressing force based on the pressure in the spring chamber 14 through the relief hole 33*a*. When the pressing force based on the pressure in the spring chamber 14 exceeds the force of the spring 34 pressing the poppet 35, the poppet 35 is moved rightward as viewed in FIG. 2. This opens the relief hole 33*a*. Hydraulic oil thus flows to the return line 2 from the spring chamber 14 through the relief passage 31. The pressure in the spring chamber 14 is lowered accordingly. As a result, the main spool 12 is moved rightward as viewed in FIG. 2 to open the bypass line 11 and functions to maintain the pressure in the pump line 1 equal to or lower than the permissible value. The permissible value is adjusted by changing the force of the spring 34 with an adjuster screw 36 threaded to the cartridge body 33.

The pilot cartridge 32 and the main spool 12 form the relief valve mechanism. The pilot cartridge 32 functions as a relief pressure controller that controls the pressure in the spring chamber 14.

As shown in FIG. 1, the switching valves 3 to 6 receive hydraulic oil pressure from the pump line 1 through the decompression valve 37 in this embodiment. The switching valves 3 to 6 are switched by using the pressure of hydraulic oil as pilot pressures. This structure eliminates the necessity of a relief valve dedicated to the pilot circuit.

When the switching valves 3 to 6 of the above described hydraulic control device are not manipulated, the switching valves 3 to 6 are at the neutral positions (see FIG. 1). In this state, the pressure of hydraulic oil from the hydraulic pump P acts on the pilot chamber 25 of the pilot switching valve 22 through the first constriction 15 and the spring chamber

14. The spring chamber 28 of the pilot switching valve 22 receives the pressure of hydraulic oil that has been reduced by the decompression valve 37. Therefore, the spool 23 of the pilot switching valve 22 is moved to a position at which the force based on the set pressure of the decompression valve 37 acting on the spring chamber 28 and the force of the spring 26 is equilibrium with the force based on the pressure of hydraulic oil acting on the pilot chamber 25. The oil passage 24*a* is opened to a degree that corresponds to the axial position of the spool 23.

Therefore, hydraulic oil flows from the pump line 1 to the return line 2 through the first constriction 15, the spring chamber 14, and the pressure control passage 21 at a flow rate corresponding to the opening degree of the oil passage 24*a*. The flow of hydraulic oil through the first constriction 15 creates a pressure difference that corresponds to the opening degree of the oil passage 24*a* between a section upstream of the first constriction 15 and a section downstream of the first constriction 15. Specifically, the pressure difference is created between the pump line 1, which is upstream of the first constriction 15, and the spring chamber 14, which is downstream of the first constriction 15. The greater the opening degree of the oil passage 24*a* is, the greater the pressure difference between the sections upstream and downstream of the first constriction 15 will be. In other words, the greater the opening degree of the oil passage 24*a* is, the lower the pressure in the spring chamber 14 will be relative to the pressure in the pump line 1. On the other hand, the pilot chamber 16, which is located at the opposite side of the main spool 12 from the spring chamber 14, is exposed to the pressure of hydraulic oil of the pump line 1 through the second constriction 17.

Therefore, the main spool 12 is moved toward the spring chamber 14 (rightward as viewed in FIG. 2) and opens the bypass line 11. As a result, the pump line 1 is connected to the return line 2 through the bypass line 11. Therefore, the opening degree of the oil passage 24*a* is determined by the set pressure of the decompression valve 37 and the force of the spring 26, and when the switching valves 3 to 6 are not manipulated, hydraulic oil from the hydraulic pump P is returned to the tank T at a flow rate that corresponds to the opening degree of the oil passage 24*a*.

When any of the switching valves 3 to 6 is manipulated from the neutral position, the pump line 1 is connected the corresponding one of the hydraulic lines 3*a*, 4*a*, 4*b*, 5*a*, 5*b*, 6*a*, 6*b* through the operated one of the switching valves 3 to 6. Accordingly, hydraulic oil is supplied to the corresponding one of the cylinders 30 to 60. At this time, if the cylinders 30 to 60 are actuated with a hydraulic pressure that is less than the permissible value set by the relief valve mechanism, the poppet 35 of the pilot cartridge 32 is closed. The pressure of hydraulic oil in the pump line 1 acts on the spring chamber 14 through the first constriction 15. The pressure of hydraulic oil in the spring chamber 14 acts on the pilot chamber 25 of the pilot switching valve 22 through the oil passage 25*a*. On the other hand, the load pressure of the cylinders 30 to 60, which are connected to the pump line 1, acts on the spring chamber 28 of the pilot switching valve 22 through the feedback line 27 (see FIG. 1). Compared to a state before any one of the switching valves 3 to 6 is manipulated, the spool 23 is moved rightward as viewed in FIG. 2 by an amount corresponding to the load pressure, thereby decreasing the opening degree of the oil passage 24*a*. Thus, the flow rate of hydraulic oil that flows from the spring chamber 14 to the return line 2 through the pressure control passage 21 is decreased in accordance with the decrease in the opening degree of the oil passage 24*a*.

When the flow rate of hydraulic oil flowing from the spring chamber 14 to the return line 2 is decreased, the pressure difference between the sections upstream and downstream of the first constriction 15 is also decreased. In other words, as the opening degree of the oil passage 24*a* is decreased, the pressure in the spring chamber 14 increases to approach the pressure in the pump line 1. Therefore, the force that presses the main spool 12 toward the pilot chamber 16 is increased, and the main spool 12 is moved toward the pilot chamber 16 to decrease the opening degree of the bypass line 11. As a result, the flow rate of hydraulic oil that flows to the return line 2 from the pump line 1 through the bypass line 11 is decreased. Accordingly, hydraulic oil in the pump line 1 is supplied to one of the cylinders 30 to 60 that corresponds to the manipulated one of the switching valves 3 to 6, and actuates the one of the cylinders 30 to 60.

The flow rate compensation valve mechanism including the main spool 12 and the pilot switching valve 22 adjusts the flow rate of hydraulic oil flowing from the pump line 1 to the return line 2, thereby compensating for the flow rate of hydraulic oil supplied from the pump line 1 to the cylinders 30 to 60. Therefore, the flow rate of hydraulic oil flowing from the pump line 1 to the cylinders 30 to 60 is maintained to a flow rate that corresponds to the opening degree of the switching valves 3 to 6 regardless of fluctuations of loads on the cylinders 30 to 60. In other words, the cylinders 30 to 60 are operated at an actuation amount (actuation speed) that corresponds to the opening degree of the switching valves 3 to 6 regardless of the load fluctuations in the cylinders 30 to 60.

In this embodiment, the pilot switching valve 22 controls the pressure in the spring chamber 14 of the main spool 12 according to the load pressure in the cylinders 30 to 60, which collectively function as the load actuator. In other words, the function of the flow rate compensation valve mechanism is shared by the main spool 12 and the pilot switching valve 22. Therefore, compared to the prior art in which the flow rate compensation mechanism for the downstream circuit is constructed only with the main spool, the range of the flow rate of hydraulic oil supplied to the downstream circuit, which range precludes the influence of the load pressure of the downstream circuit, is expanded.

When the cylinders 30 to 60 of this embodiment are being actuated, the relief valve mechanism limits the pressure of hydraulic oil in the cylinders 30 to 60 equal to or less than a permissible value. The relief valve mechanism is formed with the main spool 12, which forms a part of the flow rate compensation valve mechanism, and the pilot cartridge 32. That is, the main spool 12, which constitutes a part of the flow rate compensation valve mechanism, also functions as the spool of the relief valve mechanism. Thus, the number of required spools is reduced, and the construction is simplified.

The restriction 18 prevents the main spool 12 from rapidly moving in a direction opening the bypass line 11, thereby preventing impacts and vibrations due to rapid movements of the main spool 12.

A second embodiment of the present invention will now be described with reference to FIGS. 5 to 6. The differences from the first embodiment shown in FIGS. 1 to 4 will mainly be discussed. A hydraulic control device of the second embodiment is configured by adding an unloading function to the hydraulic control device of the first embodiment. The unloading function refers to a function to eliminate load acting on the hydraulic pump P.

Figure 5:
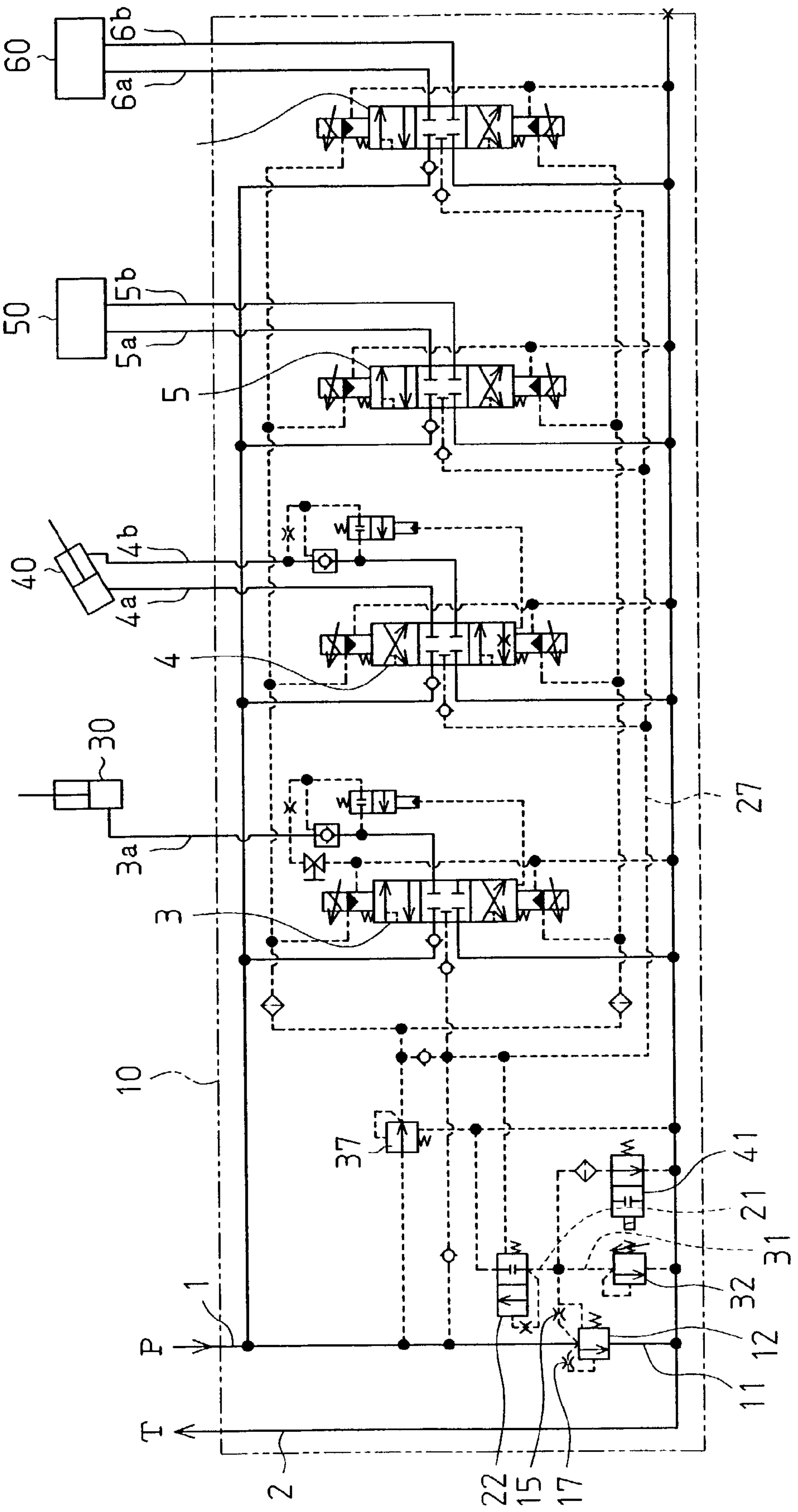
FIG. 5 is a circuit diagram showing a hydraulic control device according to a second embodiment of the present invention.
Figure 6:
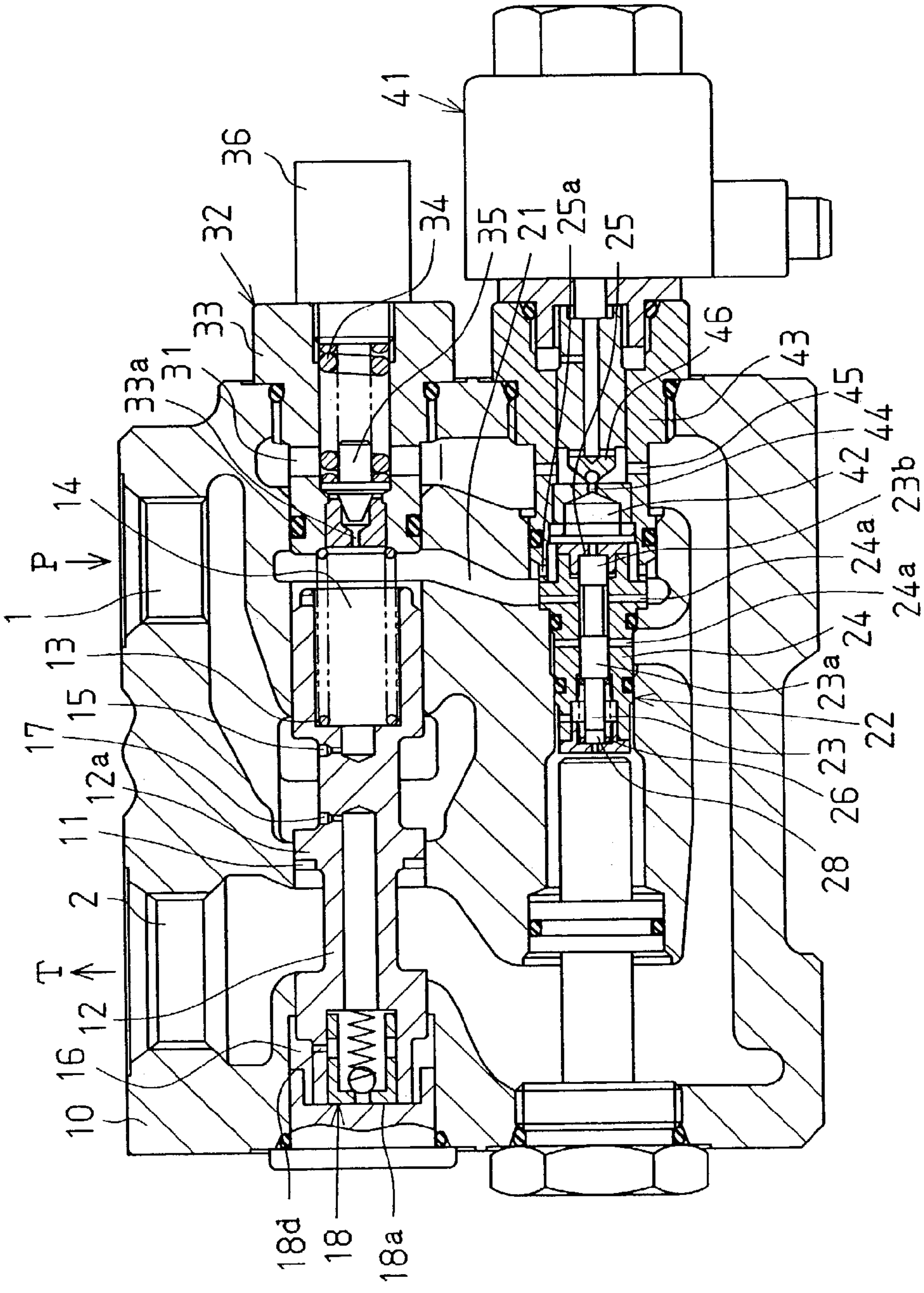
FIG. 6 is a cross-sectional view illustrating a main part of the hydraulic control device shown in FIG. 5.

As shown in FIGS. 5 and 6, an electromagnetic switching valve 41 is provided in this embodiment. The electromagnetic switching valve 41 realizes the unloading function by selectively connecting and disconnecting the spring chamber 14 with the return line 2. Specifically, as shown in FIG. 6, the electromagnetic switching valve 41 includes a main body 43 attached to the valve body 10. The main body 43 has an oil chamber 42. The oil chamber 42 is connected to a section of the pressure control passage 21 that is upstream of the pilot switching valve 22 through the oil passage 25*a*. The oil chamber 42 is connected to the return line 2 through an orifice 44 and an oil passage 45. The electromagnetic switching valve 41 includes a plunger 46, which is movable in the axial direction. The plunger 46 selectively opens and closes the orifice 44. The pressure control passage 21, the oil passage 25*a,* the oil chamber 42, the orifice 44, and the oil passage 45 form a drain passage.

When all the switching valves 3 to 6 are at the neutral positions, the electromagnetic switching valve 41 moves the plunger 46 rightward (backward) as viewed in FIG. 6. This opens the orifice 44 connects the spring chamber 14 to the return line 2 through the orifice 44. Accordingly, hydraulic oil flows out through the first constriction 15, which creates the pressure difference between the sections upstream and downstream of the first constriction 15. On the other hand, the pilot chamber 16 is exposed to the pressure of hydraulic oil in the pump line 1 through the second constriction 17. Thus, the main spool 12 moves toward the spring chamber 14 and opens the bypass line 11. The pump line 1 and the return line 2 are connected to each other by the bypass line 11. As a result, hydraulic oil from the hydraulic pump P is returned to the tank T, which eliminates the load acting on the hydraulic pump P. That is, the electromagnetic switching valve 41 and the main spool 12 realize the unloading function.

When any one of the switching valves 3 to 6 is moved to an actuation position, the plunger 46 of the electromagnetic switching valve 41 is moved leftward as viewed in FIG. 6 and closes the orifice 44. This disconnects the spring chamber 14 and the return line 2 from each other, and switches the hydraulic pump P to a loaded state. Subsequent operations are the same as those of the first embodiment.

As described above, in the hydraulic control device of the second embodiment, the main spool 12, which forms a part of the flow rate compensation valve mechanism, and the electromagnetic switching valve 41 form an unloading valve mechanism. Therefore, the main spool 12, which has a function as the flow rate compensation valve mechanism, also functions not only as a spool of the relief valve mechanism descried in the first embodiment, but also as a spool of the unloading valve mechanism. Thus, the device of the second embodiment additionally has the unloading function without increasing the number of the spools. Accordingly, the structure is simplified. Also, since hydraulic oil in the pump line 1 is directly returned to the return line 2 through the bypass line 11 without passing through other devices during the unloaded state of the hydraulic pump P, the circuit loss is decreased.

A third embodiment of the present invention will now be described with reference to FIGS. 7 to 8. The differences from the second embodiment shown in FIGS. 5 to 6 will mainly be discussed. A hydraulic control device of the third embodiment is configured by adding a second relief valve mechanism to the hydraulic control device of the second embodiment. In this embodiment, the relief valve mechanism of the first or second embodiment is referred to as a first relief valve mechanism, and the pilot cartridge 32 forming a part of the first relief valve mechanism is referred to as a first pilot cartridge 32. Also, a relief pressure set by the first pilot cartridge 32, or the permissible value, is referred to as a first permissible value.

Figure 7:
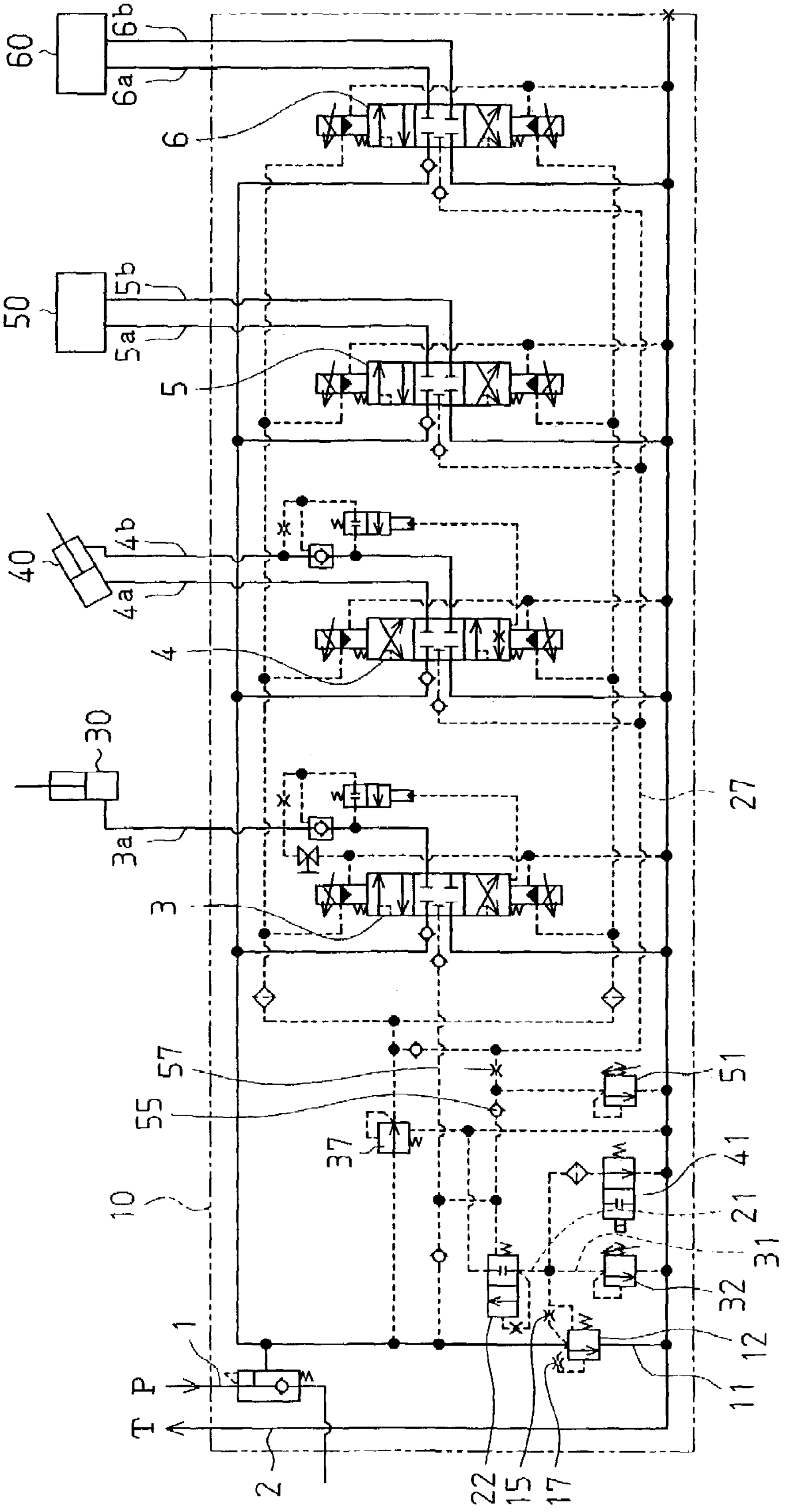
FIG. 7 is a circuit diagram showing a hydraulic control device according to a third embodiment of the present invention.
Figure 8:
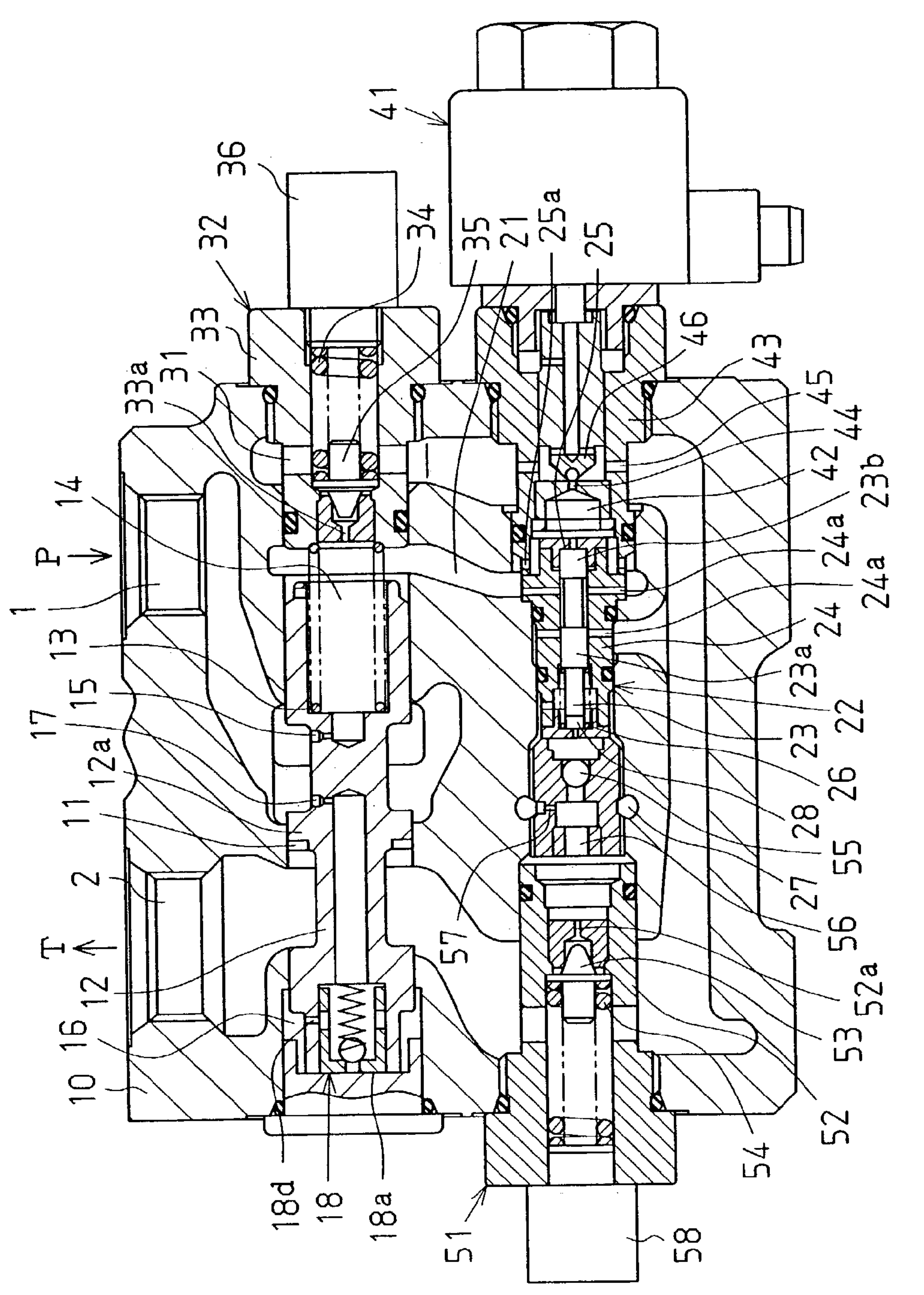
FIG. 8 is a cross-sectional view illustrating a main part of the hydraulic control device shown in FIG. 7.

As shown in FIGS. 7 and 8, a second pilot cartridge 51, which forms a part of the second relief valve mechanism, is attached to the valve body 10. The second pilot cartridge 51 includes a cartridge body 52 having a relief hole 52*a,* a poppet 53 for selectively opening and closing the relief hole 52*a,* and a spring 54 that urges the poppet 53 in a direction closing the relief hole 52*a*. The relief hole 52*a* is connected to the spring chamber 28 of the pilot switching valve 22 through an oil passage 56 having a check valve 55. The oil passage 56, which connects the relief hole 52*a* to the spring chamber 28, is connected to the feedback line 27 through a constriction 57. The feedback line 27 exposes the oil passage 56 to the load pressure of the cylinders 30 to 60.

The poppet 53 is always pressed against the sealing surface of the cartridge body 52 by the spring 54, thereby closing the relief hole 52*a*. Accordingly, the poppet 53 limits the pressure in a hydraulic line connected to at least specific one of all the cylinders 30 to 60 to a value equal to or less than a second permissible value. In this embodiment, as shown in FIG. 7, the feedback line 27 is connected to the cylinders other than the lift cylinder 30. That is, the feedback line 27 is connected to the hydraulic lines that have passed through the switching valves 4, 5, 6 corresponding to the tilt cylinder 40 and the two attachment cylinders 50, 60. The load pressure of the three cylinders 40, 50, 60 other than the lift cylinder 30 is introduced to the spring chamber 28 of the pilot switching valve 22 through the feedback line 27.

A relief pressure set by the second pilot cartridge 51, or the second permissible value, is adjusted by changing the pressing force of the spring 54 with an adjuster screw 58 threaded to the cartridge body 52. The second permissible value is less than the first permissible value, which is set by the first pilot cartridge 32. The second pilot cartridge 51 and the main spool 12 form the second relief valve mechanism. The second pilot cartridge 51 functions as a second relief pressure controller.

In the hydraulic control device of this embodiment, when the switching valves 3 to 6 are not manipulated, that is, when the switching valves 3 to 6 are at the neutral positions, the first relief valve mechanism including the first pilot cartridge 32 and the main spool 12 limits the pressure in the pump line 1 equal to or lower than the first permissible value as described in the first embodiment shown in FIGS. 1 to 4. When the lift cylinder 30 is actuated according to manipulation of the lift cylinder switching valve 3 to an actuation position, the first relief valve mechanism limits the pressure of hydraulic oil in the lift cylinder 30 to a value equal to or lower than the first permissible value.

On the other hand, when any one of the tilt cylinder switching valve 4 or the attachment cylinder switching valves 5, 6 is moved to the actuation position, the load pressure in the corresponding cylinder 40 to 60 acts on the spring chamber 28 of the pilot switching valve 22 from the feedback line 27 through the constriction 57, the oil passage 56, and the check valve 55. In response to the load pressure, as in the first embodiment of FIGS. 1 to 4, the flow rate compensation valve mechanism including the pilot switching valve 22 and the main spool 12 compensates for the flow rate of hydraulic oil supplied to the downstream circuit.

When the tilt cylinder 40 or the attachment cylinders 50, 60 are actuated, if the pressure in the operating cylinder (load pressure) exceeds a second permissible value set by the second pilot cartridge 51, the load pressure moves the poppet 53 to open the relief hole 52*a*. Accordingly, the feedback line 27 is connected to the return line 2 through the oil passage 56 and the relief hole 52*a*. Thus, the pressure acting on the spring chamber 28 of the pilot switching chamber 22 is prevented from exceeding the second permissible value. As described in the first embodiment shown in FIGS. 1 to 4, the pilot switching valve 22 adjusts the flow rate of hydraulic oil flowing from the spring chamber 14 of the main spool 12 to the return line 2 through the oil passage 24*a* in accordance with the load pressure of the cylinders 40 to 60. Therefore, the opening degree of the bypass line 11 determined by the main spool 12 is adjusted to an opening degree that corresponds to the flow rate of hydraulic oil flowing to the return line 2 through the pilot switching valve 22, and some of hydraulic oil sent from the hydraulic pump P is returned to the tank T. This maintains the pressure of hydraulic oil in the cylinders 40 to 60 equal to or lower than the second permissible value.

In this manner, the hydraulic control device of the second embodiment is capable of setting upper limit value of the pressure of hydraulic oil in the downstream circuit to two values, that is, to the first permissible value (the first relief pressure), which is set by the first pilot cartridge 32, and to the second permissible value (the second relief pressure), which is set by the second pilot cartridge 51.

Also, the main spool 12, which forms a part of the flow rate compensation valve mechanism, and the second pilot cartridge 51 form the second relief valve mechanism. Therefore, the main spool 12, which functions as the flow rate compensation valve mechanism, also functions as the spool of the second relief valve mechanism, in addition to as the spool of the first relief valve mechanism described in the first embodiment and as the spool of the unloading valve described in the second embodiment. Therefore, while adding the function of the second relief valve mechanism, the number of the spools is not increased, and the structure is simplified.

A fourth embodiment of the present invention will now be described with reference to FIG. 9. The differences from the first embodiment shown in FIGS. 1 to 4 will mainly be discussed. A hydraulic control device of the fourth embodiment is different from that of the first embodiment in that the main spool 12 is replaced by a plunger 61.

Figure 9:
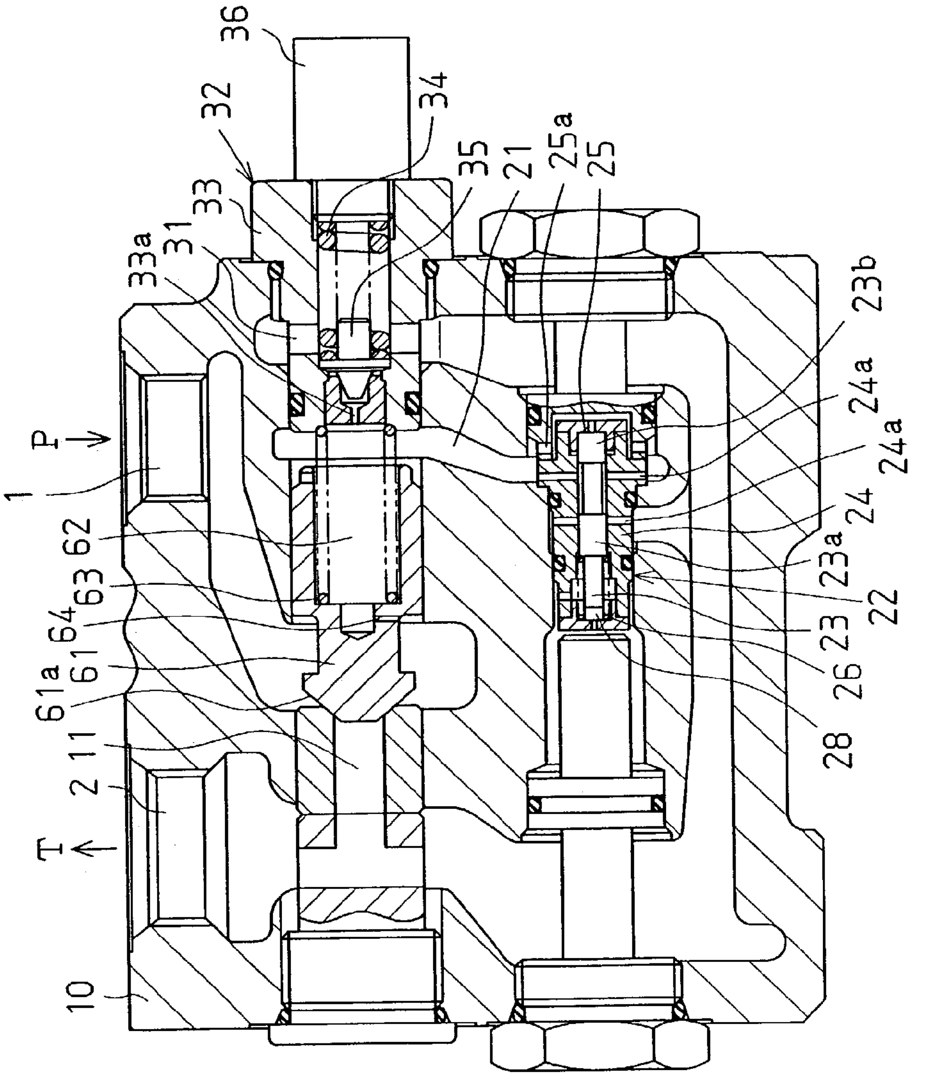
FIG. 9 is a cross-sectional view illustrating a main part of a hydraulic control device according to a fourth embodiment.

In this embodiment, the plunger 61 is attached to the valve body 10 to be movable in the axial direction as shown in FIG. 9. The plunger 61 is pressed against the valve seat surface by a spring 63 accommodated in a spring chamber 62 and closes the bypass line 11. The spring chamber 62 is exposed to the pressure of hydraulic oil in the pump line 1 through a constriction 64. The pressure of hydraulic oil in the spring chamber 62 acts on the plunger 61 in a direction closing the bypass line 11. The pressure of hydraulic oil in the pump line 1 acts on an end surface 61*a* of the plunger 61 located in the pump line 1 in a direction opening the bypass line 11.

When the hydraulic pump P is not operating, the plunger 61 is urged by the force of the spring 63 and closes the bypass line 11. When the hydraulic pump P is operating, the plunger 61 is moved to an axial position at which a force based on the pressure acting on the spring chamber 62 and the force of the spring 63 is in equilibrium with a force based on the pressure of hydraulic oil in the pump line 1 acting on the end surface 61*a*. The plunger 61 controls the opening degree of the bypass line 11 to an opening degree corresponding to the pressure in the spring chamber 62.

The plunger 61 functions as an actuation valve member. The spring chamber 62 corresponds to the first pressure chamber. The space the pressure of which acts on the end surface 61*a* of the plunger 61 corresponds to the second pressure chamber. The plunger 61 and the pilot switching valve 22 form a flow rate compensation valve mechanism. The plunger 61 and the pilot cartridge 32 form a relief valve mechanism.

The hydraulic control device of this embodiment operates in substantially the same manner as that of the first embodiment shown in FIGS. 1 to 4, and has substantially the same advantages as that of the first embodiment shown in FIGS. 1 to 4. Particularly, since the plunger 61 is pressed against the valve seat surface when the bypass line 11 is closed, leakage of hydraulic oil through the bypass line 11 is effectively prevented.

Figure 10:
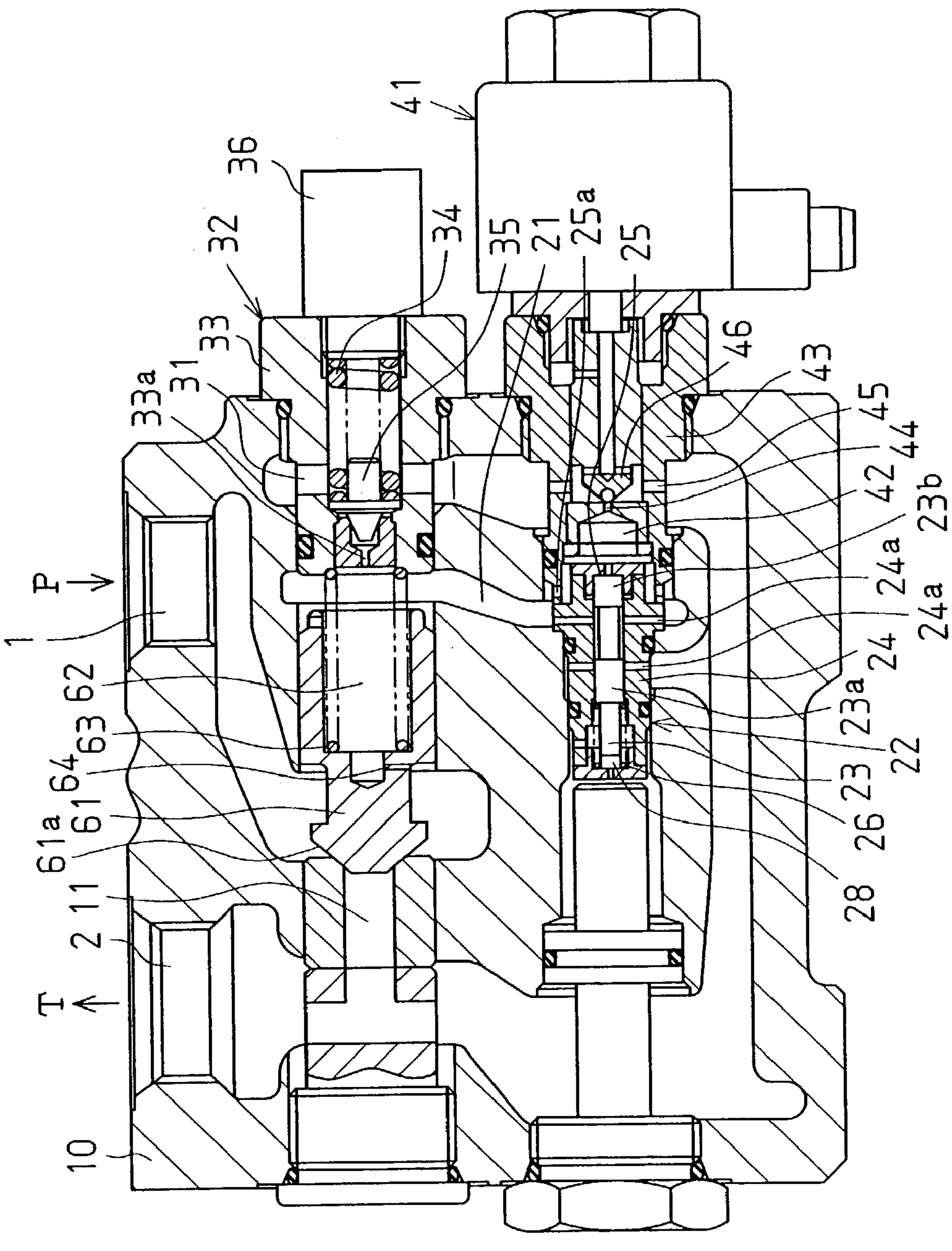
FIG. 10 is a cross-sectional view illustrating a main part of a hydraulic control device according to a fifth embodiment.
Figure 11:
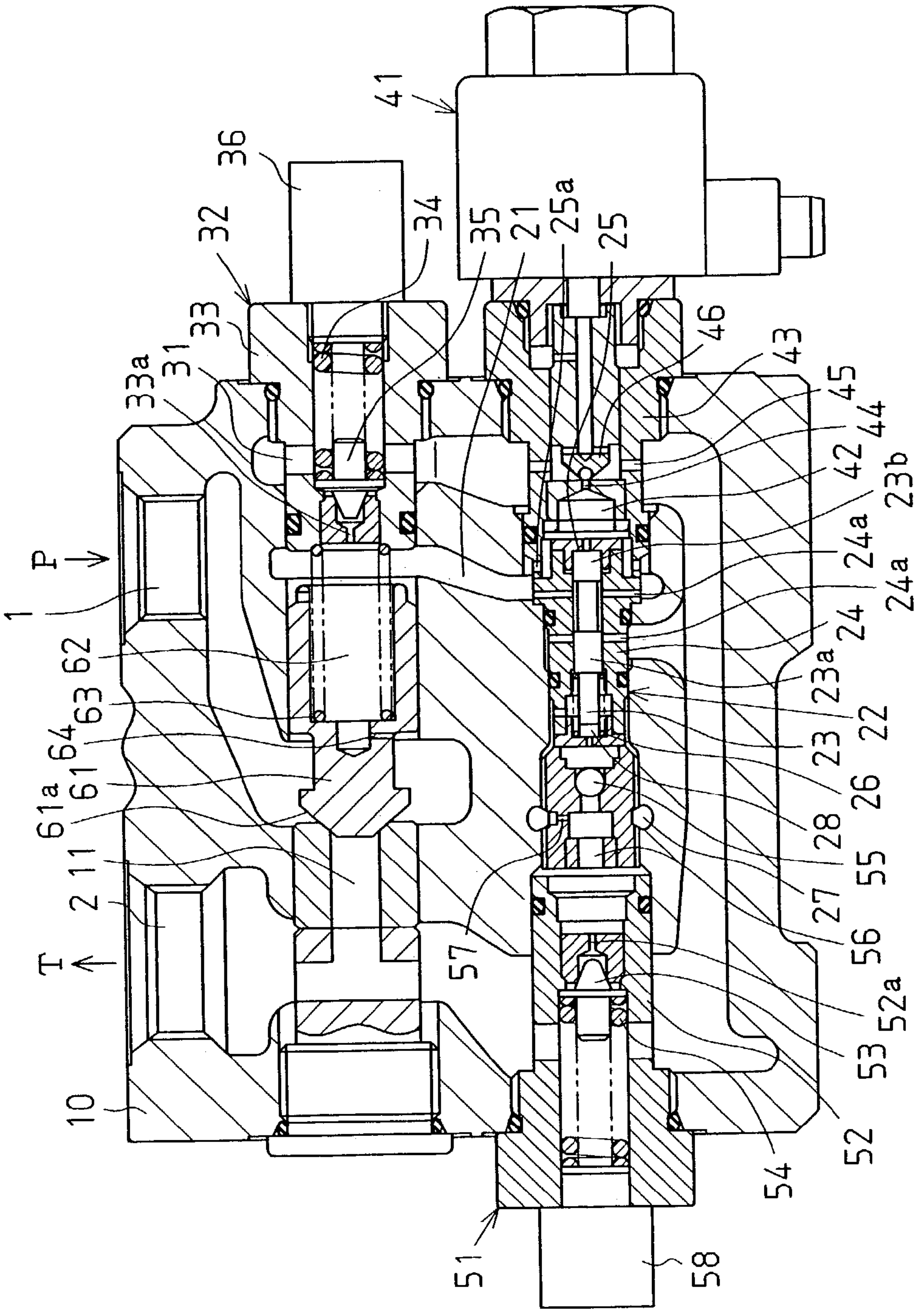
FIG. 11 is a cross-sectional view illustrating a main part of a hydraulic control device according to a sixth embodiment.

FIG. 10 illustrates a hydraulic control device according to a fifth embodiment of the present invention, and FIG. 11 illustrates a hydraulic control device according to a sixth embodiment. The hydraulic control device of the fifth embodiment is the same as that of the second embodiment except for that the main spool 12 is replaced by a plunger 61 similar to that shown in FIG. 9. The hydraulic control device of the sixth embodiment is the same as that of the third embodiment except for that the main spool 12 is replaced by a plunger 61 similar to that shown in FIG. 9.

Therefore, the fifth embodiment operates substantially the same manner as the second embodiment and has substantially the same advantages as the second embodiment. The sixth embodiment operates substantially the same manner as the third embodiment and has substantially the same advantages as the third embodiment.

Therefore, the present examples and embodiments are to be considered as illustrative and not restrictive and the invention is not to be limited to the details given herein, but may be modified within the scope and equivalence of the appended claims.

The invention claimed is:

1. A hydraulic control device for controlling supply of hydraulic fluid from a high pressure circuit to a downstream circuit, wherein the downstream circuit includes a plurality of hydraulic actuators and a plurality of switching valves for operating the hydraulic actuators, the hydraulic actuators including at least a first hydraulic actuator and a second hydraulic actuator, wherein the high pressure circuit is connected to a hydraulic fluid return circuit through a bypass line, the hydraulic control device comprising:

a flow rate compensation mechanism, which adjusts the opening degree of the bypass line according to the load pressure of the downstream circuit, thereby adjusting the flow rate of hydraulic fluid flowing from the high pressure circuit to the return circuit such that the flow rate of hydraulic fluid supplied from the high pressure circuit to the downstream circuit is compensated for, wherein the flow rate compensation mechanism includes:

an actuation valve member, which is movable in an axial direction to adjust the opening degree of the bypass line, wherein the actuation valve member includes a first end and a second end opposite from the first end;

a first pressure chamber corresponding to the first end of the actuation valve member, wherein hydraulic fluid from the high pressure circuit is drawn into the first pressure chamber;

a second pressure chamber corresponding to the second end of the actuation valve member, wherein hydraulic fluid from the high pressure circuit is drawn into the second pressure chamber, wherein the pressure of hydraulic fluid in the first pressure chamber presses the actuation valve member toward the second pressure chamber, wherein the pressure of hydraulic fluid in the second pressure chamber presses the actuation valve member toward the first pressure chamber, and wherein the actuation valve member is moved in the axial direction according to the pressure of hydraulic fluid in the first pressure chamber and the pressure of hydraulic fluid in the second pressure chamber;

a pressure controller, which controls the pressure of hydraulic fluid in the first pressure chamber according to the load pressure of the downstream circuit;

a first relief valve mechanism, which limits the pressure of hydraulic fluid in the first hydraulic actuator to a value that is equal to or lower than a predetermined first permissible value, wherein the first relief valve mechanism includes a first relief pressure controller, wherein the first relief pressure controller opens and closes a relief passage that connects the first pressure chamber to the return circuit, thereby adjusting the pressure of hydraulic fluid in the first pressure chamber; and a second relief valve mechanism, which limits the pressure of hydraulic fluid in the second hydraulic actuator to a value that is equal to or lower than a predetermined second permissible value, wherein the second relief valve mechanism includes a second relief pressure controller, and wherein the second relief pressure controller selectively permits hydraulic fluid receiving the load pressure of the second hydraulic actuator to flow to the return circuit, thereby adjusting the load pressure of the second hydraulic actuator acting on the pressure controller.

2. The hydraulic control device according to claim 1, wherein the actuation valve member functions as a part of the first relief valve mechanism.

3. The hydraulic control device according to claim 1, wherein the actuation valve member functions as a part of the second relief valve mechanism.

4. The hydraulic control device according to claim 1, wherein the pressure of hydraulic fluid in the first pressure chamber presses the actuation valve member in a direction closing the bypass line, wherein the hydraulic control device further comprises an electromagnetic switching valve that is capable of opening and closing a drain passage connecting the first pressure chamber to the return circuit.

5. The hydraulic control device according to claim 1, further comprising a restriction located in an fluid passage connecting the high pressure circuit to the second pressure chamber, wherein the restriction sets a greater resistance to flow of hydraulic fluid when hydraulic fluid is flowing from the high pressure circuit into the second pressure chamber than when hydraulic fluid is flowing out from the second pressure chamber to the high pressure circuit.

6. The hydraulic control device according to claim 1, wherein the actuation valve member is a spool.

7. The hydraulic control device according to claim 1, wherein the first pressure chamber is connected to the return circuit through a pressure control passage, wherein the pressure controller includes a spool, the spool being movable in an axial direction to adjust the opening degree of the pressure control passage, wherein the spool has one end that receives the load pressure of the hydraulic actuators and another end that receives the pressure of hydraulic fluid in the first pressure chamber, and wherein the spool is moved in the axial direction according to the pressures acting on the ends.

8. An industrial vehicle equipped with a hydraulic control device, the vehicle comprising:

a hydraulic pump;

a high pressure circuit connected to the hydraulic pump;

a plurality of hydraulic actuators including at least a first hydraulic actuator and a second hydraulic actuator;

a plurality of switching valves, each of which is located in a fluid passage extending between the corresponding one of the hydraulic actuators and the high pressure circuit, wherein each switching valve operates the corresponding hydraulic actuator;

a hydraulic fluid return circuit connected to the high pressure circuit through a bypass line; and a flow rate compensation mechanism, which adjusts the opening degree of the bypass line according to the load pressure of the hydraulic actuators, thereby adjusting the flow rate of hydraulic fluid flowing from the high pressure circuit to the return circuit such that the flow rate of hydraulic fluid supplied from the high pressure circuit to the hydraulic actuators is compensated for, wherein the flow rate compensation mechanism includes:

a main spool, which is movable in an axial direction to adjust the opening degree of the bypass line, wherein the main spool includes a first end and a second end opposite from the first end;

a first pressure chamber corresponding to the first end of the main spool, wherein hydraulic fluid from the high pressure circuit is drawn into the first pressure chamber;

a second pressure chamber corresponding to the second end of the main spool, wherein hydraulic fluid from the high pressure circuit is drawn into the second pressure chamber, wherein the pressure of hydraulic fluid in the first pressure chamber presses the main spool toward the second pressure chamber, wherein the pressure of hydraulic fluid in the second pressure chamber presses the main spool toward the first pressure chamber, and wherein the main spool is moved in the axial direction according to the pressure of hydraulic fluid in the first pressure chamber and the pressure of hydraulic fluid in the second pressure chamber;

a pilot switching valve, which controls the pressure of hydraulic fluid in the first pressure chamber according to the load pressure of the hydraulic actuators;

a first relief valve mechanism, which limits the pressure of hydraulic fluid in the first hydraulic actuator to a value that is equal to or lower than a predetermined first permissible value, wherein the first relief valve mechanism includes the main spool and a first relief pressure controller, wherein the first relief pressure controller opens and closes a relief passage that connects the first pressure chamber to the return circuit, thereby adjusting the pressure of hydraulic fluid in the first pressure chamber; and a second relief valve mechanism, which limits the pressure of hydraulic fluid in the second hydraulic actuator to a value that is equal to or lower than a predetermined second permissible value, wherein the second relief valve mechanism includes the main spool and a second relief pressure controller, wherein the second relief pressure controller selectively permits hydraulic fluid receiving the load pressure of the second hydraulic actuator to flow to the return circuit, thereby adjusting the load pressure of the second hydraulic actuator acting on the pilot switching valve.

9. The industrial vehicle according to claim 8, wherein the pressure of hydraulic fluid in the first pressure chamber presses the main spool in a direction closing the bypass line, wherein the industrial vehicle further comprises an electromagnetic switching valve that is capable of opening and closing a drain passage connecting the first pressure chamber to the return circuit.

10. The industrial vehicle according to claim 8, further comprising a restriction located in an fluid passage connecting the high pressure circuit to the second pressure chamber, wherein the restriction sets a greater resistance to flow of hydraulic fluid when hydraulic fluid is flowing from the high pressure circuit into the second pressure chamber than when hydraulic fluid is flowing out from the second pressure chamber to the high pressure circuit.

11. The industrial vehicle according to claim 8, wherein the first pressure chamber is connected to the return circuit through a pressure control passage, wherein the pilot switching valve includes a sub-spool, the sub-spool being movable in an axial direction to adjust the opening degree of the pressure control passage, wherein the sub-spool has one end that receives the load pressure of the hydraulic actuators and another end that receives the pressure of hydraulic fluid in the first pressure chamber, and wherein the sub-spool is moved in the axial direction according to the pressures acting on the ends.

12. A hydraulic control device for controlling supply of hydraulic fluid from a high pressure circuit to a downstream circuit, wherein the downstream circuit includes a hydraulic actuator and a switching valve for operating the hydraulic actuator, wherein the high pressure circuit is connected to a hydraulic fluid return circuit through a bypass line, the hydraulic control device comprising:

a flow rate compensation mechanism, which adjusts the opening degree of the bypass line according to the load pressure of the downstream circuit, thereby adjusting the flow rate of hydraulic fluid flowing from the high pressure circuit to the return circuit such that the flow rate of hydraulic fluid supplied from the high pressure circuit to the downstream circuit is compensated for, wherein the flow rate compensation mechanism includes:

an actuation valve member, which is movable in an axial direction to adjust the opening degree of the bypass line, wherein the actuation valve member includes a first end and a second end opposite from the first end;

a first pressure chamber corresponding to the first end of the actuation valve member, wherein hydraulic fluid from the high pressure circuit is drawn into the first pressure chamber;

a second pressure chamber corresponding to the second end of the actuation valve member, wherein hydraulic fluid from the high pressure circuit is drawn into the second pressure chamber, wherein the pressure of hydraulic fluid in the first pressure chamber presses the actuation valve member toward the second pressure chamber, wherein the pressure of hydraulic fluid in the second pressure chamber presses the actuation valve member toward the first pressure chamber, and wherein the actuation valve member is moved in the axial direction according to the pressure of hydraulic fluid in the first pressure chamber and the pressure of hydraulic fluid in the second pressure chamber;

a pressure controller, which controls the pressure of hydraulic fluid in the first pressure chamber according to the load pressure of the downstream circuit; and a restriction located in an fluid passage connecting the high pressure circuit to the second pressure chamber, wherein the restriction sets a greater resistance to flow of hydraulic fluid when hydraulic fluid is flowing from the high pressure circuit into the second pressure chamber than when hydraulic fluid is flowing out from the second pressure chamber to the high pressure circuit.

* * * * *